United States Patent
Grewe et al.

(10) Patent No.: US 8,739,551 B2
(45) Date of Patent: Jun. 3, 2014

(54) METHOD FOR OPERATING A GAS TURBINE ENGINE BY CONTROLLING THE COMPRESSOR DISCHARGE PRESSURE

(75) Inventors: Claus Grewe, Essen (DE); Dieter Simon, Mülheim an der Ruhr (DE)

(73) Assignee: Siemens Aktiengesellschaft, Munich (DE)

( * ) Notice: Subject to any disclaimer, the term of this patent is extended or adjusted under 35 U.S.C. 154(b) by 901 days.

(21) Appl. No.: 12/469,713

(22) Filed: May 21, 2009

(65) Prior Publication Data

US 2009/0288420 A1   Nov. 26, 2009

(30) Foreign Application Priority Data

May 26, 2008 (EP) ..................................... 08009564

(51) Int. Cl.
  *F02C 6/08*   (2006.01)
  *F02C 9/20*   (2006.01)
(52) U.S. Cl.
  USPC ................. 60/785; 60/783; 60/784; 60/794; 60/39.12
(58) Field of Classification Search
  USPC ........... 60/794, 39.27, 39.281, 39.465, 39.12, 60/782, 785, 783, 784
  See application file for complete search history.

(56) References Cited

U.S. PATENT DOCUMENTS

| | | | | |
|---|---|---|---|---|
| 3,852,958 A * | 12/1974 | Adams et al. | ............... | 60/39.281 |
| 3,867,717 A * | 2/1975 | Moehring et al. | ............ | 340/626 |
| 4,087,961 A | 5/1978 | Avery | | |
| 4,380,893 A * | 4/1983 | Stokes et al. | ..................... | 60/785 |
| 4,574,585 A | 3/1986 | Conn | | |
| 4,627,234 A | 12/1986 | Schuh | | |
| 6,438,484 B1 * | 8/2002 | Andrew et al. | ............... | 701/100 |
| 6,513,333 B2 * | 2/2003 | Sugitani | ........................... | 60/773 |
| 6,913,636 B2 * | 7/2005 | Defrancesco et al. | ............... | 95/8 |
| 2006/0201132 A1 | 9/2006 | Hirayama | | |
| 2007/0204625 A1 * | 9/2007 | Thatcher et al. | ................. | 60/782 |
| 2007/0271929 A1 * | 11/2007 | Berry | .............................. | 60/782 |
| 2008/0047275 A1 | 2/2008 | Ziminsky et al. | | |
| 2008/0243352 A1 * | 10/2008 | Healy | ........................... | 701/100 |

FOREIGN PATENT DOCUMENTS

| | | |
|---|---|---|
| CN | 1460786 A | 12/2003 |
| CN | 1971013 A | 5/2007 |
| CN | 101033753 A | 9/2007 |
| CN | 101131124 A | 2/2008 |
| CN | 101155995 A | 4/2008 |
| CN | 101171403 A | 4/2008 |
| DE | 19516799 A1 | 11/1996 |

(Continued)

OTHER PUBLICATIONS

Isermann R: Fahrdynamik-Regelung; Friedr. Vieweg & Sohn Verlag, GWV Fachverlage GMBH, Wiesbaden; vol. 1, 2006; ISSN: -10 3-8348-0109-7; IBSN: 13 978-3-8348-0109-8; Others; 2006; DE.

(Continued)

*Primary Examiner* — William H Rodriguez
*Assistant Examiner* — Carlos A Rivera

(57) ABSTRACT

A method for operating a gas turbine comprising a compressor, a combustion chamber and a turbine is to allow a particularly safe and reliable operation of the gas turbine. Furthermore, a gas turbine and gas and steam turbine plant, which are especially suitable for carrying out the method, are disclosed. For this purpose, the compressor discharge pressure is used as a control variable.

7 Claims, 2 Drawing Sheets

(56) References Cited

FOREIGN PATENT DOCUMENTS

| EP | 1526263 | A1 | 4/2005 |
| JP | 58057098 | A | 4/1983 |
| JP | 2003278563 | A | 10/2003 |
| WO | WO 9628644 | A1 | 9/1996 |
| WO | WO 2007045528 | A1 | 4/2007 |

OTHER PUBLICATIONS

Angermann A et al: Matlab-Simulink-Stateflow; Oldenbourg Wissenschaftsverlag GMBH, München; 2007; ISSN: 978-3-486-58272-7; Others; 2007; DE.

Dörrscheidt F et al: Grundlagen Der Regelungstechnik; B. G. Teubner Stuttgart, vol. 2, 1993; ISSN: 3-519-16421-3; Others; 1993; DE.

Huth Metal: Kohle- und Teervergasung aus "Stationäre Gasturbinen" (Lechner/Seume); Springer-Verlag Berlin, vol. 1, 2006; ISSN: 3-540-42831-3; Others; 2006; DE.

ProConSol Ingenieurbüro für Automatisierungstechnik: Begrenzungsregelung Druck-Durchfluss; Berlin; Apr. 20, 2008; Fundstelle: http://proconsol.de/index-223.html; Others; 2008; DE.

Samal E et al: Grundriβ Der Praktischen Regelungstechnik; Oldenbourg Wissenschaftsverlag GMBH, München, vol. 21, 2004; ISSN: 3-486-27583-6; Others; 2004; DE.

* cited by examiner

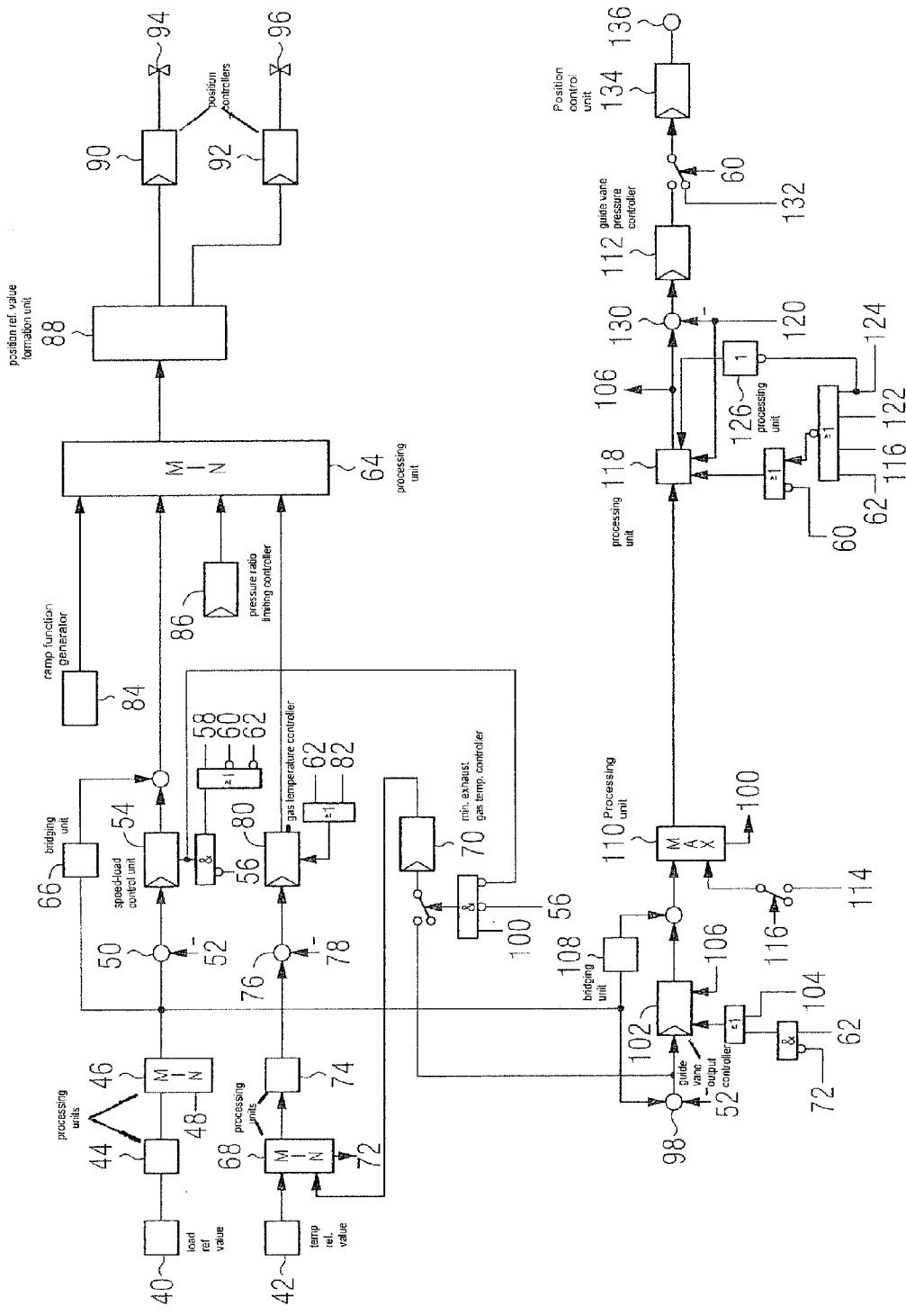

METHOD FOR OPERATING A GAS TURBINE ENGINE BY CONTROLLING THE COMPRESSOR DISCHARGE PRESSURE

CROSS REFERENCE TO RELATED APPLICATIONS

This application claims priority of European application No. 08009564.9 filed May 26, 2008, which is incorporated by reference herein in its entirety.

FIELD OF THE INVENTION

The invention refers to a method for operating a gas turbine which comprises a compressor, a combustion chamber and a turbine. It additionally refers to such a gas turbine and a gas and steam turbine plant.

BACKGROUND OF THE INVENTION

A gas turbine is a combustion engine which comprises a turbine with a compressor connected upstream and a combustion chamber connected between them. In this, air is first compressed via the blading of one or more compressor stages, then in the combustion chamber is mixed with a gaseous or liquid fuel, ignited and combusted. In addition, the air is used for cooling. In this way a hot gas (mixture consisting of combustion gas and air) results, which is expanded in the subsequent turbine section, wherein thermal energy is converted into mechanical energy. This mechanical energy first drives the compressor, the remaining portion being used for example for driving a generator.

The compressor customarily comprises a plurality of rotor wheels, with compressor blades, in an axial type of construction. It converts the kinetic energy of the inflowing air mass in the diffuser-like, i.e. diverging, interspaces of the compressor blades into pressure energy. The kinetic energy which is lost in the process is recompensated in a rotor stage. A complete compressor stage of an axial compressor therefore comprises a rotor stage, in which both pressure and temperature as well as speed increase, and a stator stage, in which the pressure rises to the disadvantage of speed. The rotor stages are arranged one behind the other on a number of drums, and the stator stages are built into the inner side of the compressor casing in a fixed manner.

The high compression of the air creates a sharp temperature rise. The air which is heated in this way then flows into the combustion chamber where a fuel is fed to it. During engine start, igniter plugs ignite the fuel, then combustion is carried out continuously. As a result of the combustion, the temperature rises again and the gas expands.

The gases which flow from the combustion chamber then impinge upon a turbine where their kinetic and thermal energy is converted into mechanical energy. Via a shaft, this first drives the compressor, and, depending upon the design purpose of the gas turbine, drives a generator for power generation.

Gas turbines are used today in gas and steam turbine plants (GuD plants) and serve there predominantly for power generation. In this case, a modern GuD plant customarily comprises one to four gas turbines and at least one steam turbine, wherein either each turbine drives a generator in each case (multishaft installation), or one gas turbine with the steam turbine on a common shaft drives a single generator (single-shaft installation). The hot exhaust gases of the gas turbine in this case are used in a heat recovery steam generator for producing steam. The steam is then fed to the steam turbine.

Customarily, the gas turbine accounts for about ⅔ of the electric power and the steam process accounts for about ⅓.

Depending upon availability of the source of energy, a GuD power generating plant can also be designed as an IGCC (Integrated Gasification Combined Cycle) plant. In this case, a fuel gasification is connected upstream to the GuD process. Primary energy (coal, biomass, waste) is gasified in this case in a gasifier, forming an energy-rich gas. The resulting crude gas is cooled, purified and in the process passes through desulphurizing plants, filters and other units. The synthesis gas which is produced in this way is then fed to the gas turbines of the GuD plant.

For producing the synthesis gas, depending upon concept, air is extracted at the compressor end of the gas turbine and separated in an air-separation plant into its main constituents of oxygen and nitrogen. In the fully integrated IGCC operation, air which is extracted exclusively from the compressor end of the gas turbine is used in this case for air separation, and in the case of the partially-integrated concept an additional external compressor is provided. The oxygen which is produced in the air-separation plant is used for synthesis gas production, and some of the nitrogen which accumulates in the air-separation plant as a byproduct is admixed with the synthesis gas and combusted in the combustion chambers of the gas turbine.

The controlling of the gas turbine is customarily carried out by means of load and temperature controllers. In so doing, the load controller customarily undertakes the maintaining/adjusting of the load reference value via adjustment of the fuel valve, and the temperature controller customarily undertakes the maintaining of a specified turbine exhaust temperature by means of adjustment of the compressor inlet guide vanes, i.e. of the guide vanes at the inlet of the compressor.

Furthermore, from US 2008/0047 275 A1 it is known to control the pressure at the exit of the compressor of a separately operated gas turbine.

Particularly in the case of the IGCC processes which are described above, instabilities (especially in the adjustment range of the inlet guide vanes) between the turbine exhaust temperature controlling and the air-separation plant can occur in the case of the customary control concept. Already slight alterations of the inlet guide vane position of the compressor of the gas turbine in this case can lead to severe fluctuations of the volume of extracted air which then react again upon the gas turbine and in the manner of a cascade lead to fluctuations which can no longer be corrected. Such severe instabilities can only be prevented by blocking of the inlet guide vanes by manual intervention of the operating personnel, wherein, however, the load controlling of the gas turbine is no longer possible. The fluctuations can even be so severe that the availability of the gas turbine and adjacent systems (such as the air-separation plant) can possibly no longer be ensured.

SUMMARY OF THE INVENTION

The invention is therefore based on the object of disclosing a method for operating a gas turbine of the aforementioned type, which allows a particularly safe and reliable operation of the gas turbine. Furthermore, a gas turbine and GuD plant which are suitable for carrying out the method are to be disclosed.

With regard to the method, this object is achieved according to the invention by the compressor discharge pressure being used as a control variable.

The invention is based on the consideration that a particularly reliable and safe operation of the gas turbine would be possible if air volume fluctuations, and instabilities in the gas turbine which are associated with it, were consequently avoided. In this case, these instabilities occur especially in the region of the exit of the compressor. These instabilities are essentially characterized by pressure fluctuations. In order to enable monitoring of these fluctuations, the pressure at the end of the compressor should be measured. In order to furthermore enable an automatic control and avoidance of the instabilities, the compressor discharge pressure should be used as a control variable when controlling the gas turbine.

In this case, a maximum rate of change of the compressor discharge pressure is specified. A change of pressure which is too fast at the compressor end is consequently avoided, especially during starting of the gas turbine or during load-changing, as a result of which an emergence of instabilities or cascades is consequently prevented.

Therefore, in these operating states the gas turbine always remains reliable and operationally safe.

In a further advantageous development, a reference value is specified for the compressor discharge pressure. This is especially advisable during the continuous running operation with a specified load reference value. As a result of the controlling and regulating of the compressor discharge pressure to a specified reference value, an altogether more stable operation of the gas turbine is made possible, furthermore the gas turbine also runs with a more constant turbine output.

The compressor discharge pressure is advantageously controlled by changing the position of the inlet guide vanes. That is to say the position of the inlet guide vanes has a direct influence upon the air volume which flows through the compressor. In the previous concept, the position of the compressor inlet guide vanes was determined on the basis of the turbine exhaust temperature. In this case, this temperature was measured by means of thermoelements which have a significantly higher reaction time than pressure sensors for the compressor discharge pressure. Consequently, the controlling of the compressor inlet guide vanes via the compressor discharge pressure can be carried out almost instantaneously (for example about 6 seconds delay/response threshold 105 mbar).

The exhaust gas temperature of the gas turbine is advantageously controlled by changing the fuel feed to the burners of the combustion chamber. By such a controlling of the turbine exhaust temperature impermissibly high turbine exhaust temperature fluctuations no longer occur since the fuel valves correct the temperature quicker and more accurately than the inlet guide vanes of the gas turbine, as provided in the previous concept.

In a further advantageous development, air is extracted from the gas turbine at the exit of the compressor. Particularly in the case of gas turbines with air extraction at the end of the compressor for an air-separation plant, which provides oxygen for the gasification of for example coal, high pressure fluctuations can occur at the end of the compressor. These instabilities occur on account of the absent mechanical decoupling of the air extraction system so that interactions occur between the systems. By means of a corresponding pressure controlling of the gas turbine these instabilities are avoided and the air-separation plant only has to extract the required mass flow.

The advantages which are associated with the invention are especially that by using the compressor discharge pressure as a control variable for controlling the gas turbine a particularly safe and reliable operation of the gas turbine can be ensured since as a result of the limiting of the rate of change of the compressor discharge pressure, which is adapted to the air-separation plant, impermissible feedbacks and instabilities in the region of the exit of the compressor cannot occur.

As a result of the pressure controlling concept, with the fully integrated IGCC operation with air extraction, the previously customary control valve between gas turbine and air-separation plant for pressure and mass flow control can be dispensed with. The air separation extracts air according to its requirement in the case of constant pressure, which is already controlled by the gas turbine, or maximum pressure gradients. In the case of the partially integrated concept, a control valve can furthermore be used for mass flow limitation for air extraction. The pressure controlling concept takes into consideration all degrees of integration in this case.

By means of the pressure controlling concept, impermissibly high turbine exhaust temperature fluctuations furthermore no longer occur since the fuel valves correct the temperature quicker and more accurately than the inlet guide vanes of the gas turbine, as a result of which an altogether smoother reaction of all plant components is made possible even in failure cases. As a result of an overriding load control the requirements of the load operator with regard to the load reference value during normal operation of the gas turbine can be fulfilled. With such a load control, the permissible pressure gradient for the air-separation plant is always maintained within the adjustment range of the inlet guide vanes.

As a result of the controller structure in the pressure controlling concept, influences from outside (air-separation plant, coal gasification) can be adjusted with clear and reproducible behavior and optimized to customer requirements.

BRIEF DESCRIPTION OF THE DRAWINGS

An exemplary embodiment of the invention is explained in more detail with reference to a drawing. In the drawing:

FIG. 2 shows a schematic view of the pressure controlling concept.

Figure 1:
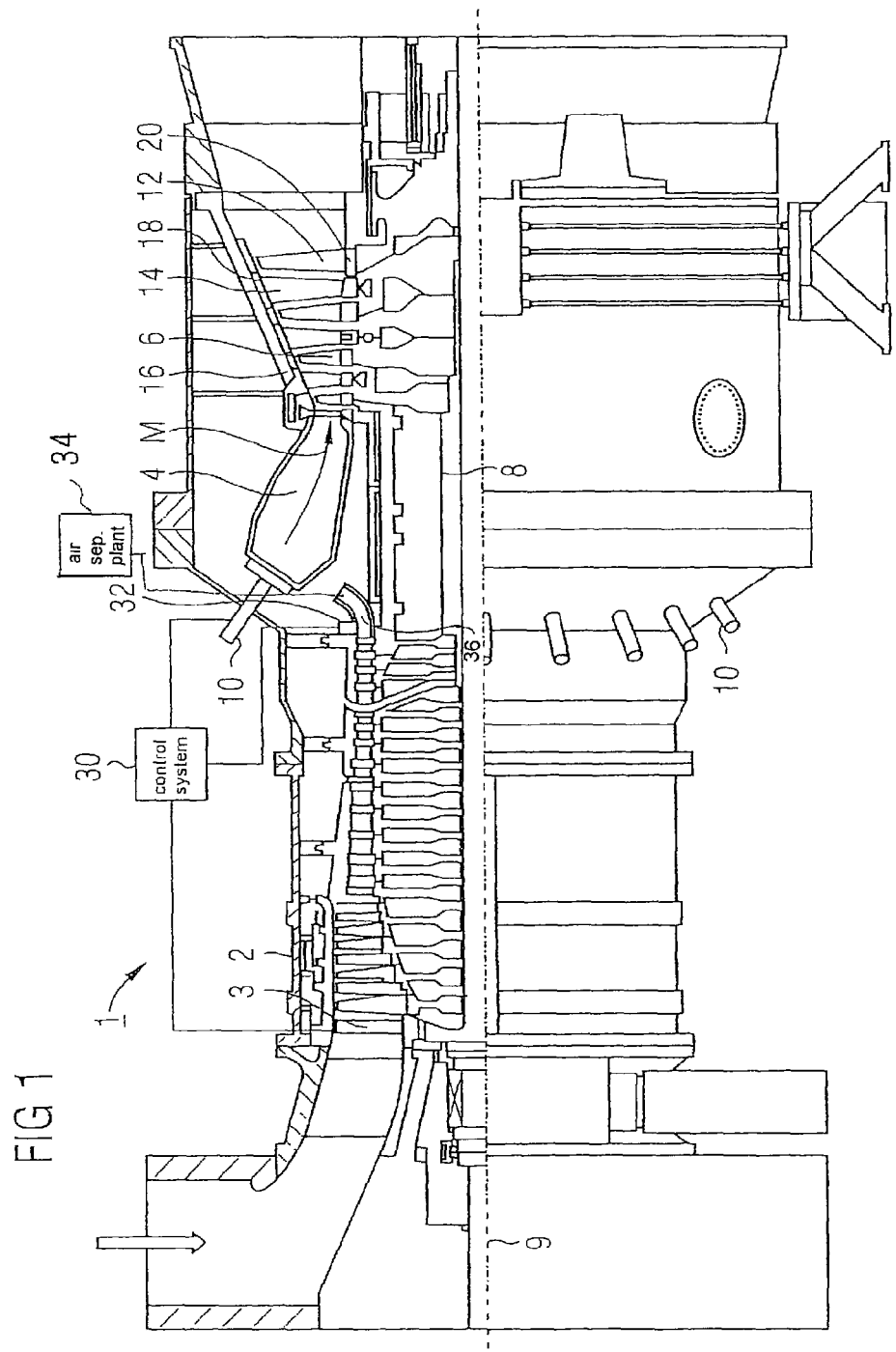
FIG. 1 shows a longitudinal section of a gas turbine.

Like components are provided with the same designations in the two figures.

DETAILED DESCRIPTION OF THE INVENTION

FIG. 1 exemplarily shows a gas turbine 1 in annular combustion chamber type of construction. A large number of other concepts such as silo combustion chambers or tubular combustion chambers are also conceivable. The gas turbine 1 in this case has a compressor 2 for compression of the combustion air. For controlling the air throughput through the compressor 2 this has variable inlet guide vanes 3. Furthermore, the gas turbine comprises a combustion chamber 4 and also a turbine 6 for driving the compressor 2 and a generator, which is not shown, or a driven machine. For this purpose, the turbine 6 and the compressor 2 are arranged on a common turbine shaft 8, which is also referred to as a turbine rotor, to which the generator or the driven machine is also connected, and which is rotatably mounted around its center axis 9.

The combustion chamber 4, which in the displayed example is constructed in the style of an annular combustion chamber, is equipped with a number of burners 10 for combusting a liquid or gaseous fuel. On its inner wall, it is furthermore provided with heat shield elements, which are not shown in more detail.

The turbine 6 has a number of rotatable rotor blades 12 which are connected to the turbine shaft 8. The rotor blades 12 are arranged in a ring-like manner on the turbine shaft 8 and form with it a number of rotor blade rows. Furthermore, the turbine 6 comprises a number of stationary stator blades 14 which are fastened on an inner casing 16 of the turbine 6 also in a ring-like manner, forming stator blade rows. The rotor blades 12, however, serve for driving the turbine shaft 8 by impulse transmission from the operating medium M which flows through the turbine 6. The stator blades 14 on the other hand serve for flow-guiding of the operating medium M between two rotor blade rows or rotor blade rings in each case which follow each other as seen in the flow direction of the operating medium M. A consecutive pair consisting of a ring of stator blades 14, or a stator blade row, and consisting of a ring of rotor blades, or a rotor blade row, in this case is also referred to as a turbine stage.

Each stator blade 14 has a platform 18, which is also referred to as a blade root, which is arranged as a wall element for fixing the respective stator blade 14 on the inner casing 16 of the turbine 6. The platform 18 in this case is a thermally comparatively heavily stressed component which forms the outer limit of a hot gas passage for the operating medium M which flows through the turbine 6. Each rotor blade 12 is fastened in a similar manner on the turbine shaft 8 via a platform 20 which is also fastened as a blade root.

For controlling the gas turbine 1, this comprises a control system 30 which on the one hand controls the fuel feed to the burners 10, and on the other hand controls the position of the inlet guide vanes 3 of the compressor 2. In this case the gas turbine load and the exhaust temperature of the flow medium M at the exhaust of the gas turbine 1 are customarily used as control variables.

In the case of the classical control concept, in which the turbine exhaust temperature is controlled by adjustment of the inlet guide vanes 3 of the compressor 2, and the turbine load is controlled by adjustment of the fuel feed to the burners 10, instabilities can occur, however, in the region of the exit of the compressor 36. This especially applies to the case where an air extraction is provided at the end of the compressor 2, which feeds air to an air-separation plant 34, and in which the air is separated into oxygen and nitrogen and the oxygen is used for gasification of a solid fuel, for example coal, into synthesis gas. For avoiding these instabilities, a pressure sensor 32, which monitors the compressor discharge pressure, is provided in the gas turbine 1 at the end of the compressor 2.

The principle of operation of the control unit 30 is shown in the circuit diagram according to FIG. 2.

First of all, a load reference value 40 and an exhaust gas temperature reference value 42 are specified for controlling the gas turbine 1. In this case, the load reference value 40 is dependent upon the requirements of the network operator or upon the required electric power for the network. The temperature reference value is determined depending upon the design of the steam boiler which in a gas and steam turbine power plant is customarily connected downstream to the gas turbine 1.

The load reference value 40 is first transmitted to a processing unit 44 which takes into consideration corresponding limiting values for changing the load and sends out a correspondingly delayed load reference value. This delayed load reference value is transmitted to a further processing unit 46 which checks the load reference value for exceeding a limiting load value 48 which is dependent upon the design of the gas turbine 1. In the process the minimum value from the limiting load value 48 and the delayed load reference value which is issued from the processing unit 44 is formed and transmitted.

In the differentiating unit 50, the difference of the specified load reference value to the current scaled load actual value 52 is the first formed and transmitted to the speed-load control unit 54. The speed-load control unit 54 in this case is enabled only when the following preconditions are fulfilled: firstly, the exhaust gas temperature control must not be activated 56, secondly, at least either the compressor inlet guide vanes must be closed 58, the inlet guide vane controller must not be activated 60, or the exhaust gas temperature control must not be in operation 62.

The load value which is determined in the speed-load controller is then transmitted to the processing unit 64. Alternatively to the processing in the speed-load controller 54, a bridging of this via a bridging unit 66 may also be carried out so that a direct proportional feedthrough of the load reference value from the processing unit 46 to the processing unit 64 is carried out.

The exhaust gas temperature reference value 42 is processed in parallel to the load reference value 40. This exhaust gas temperature value is first delivered to the processing unit 68 which forms a minimum value from the specified exhaust gas temperature reference value 42 and from an exhaust gas temperature value of the minimum exhaust gas temperature controller 70. If the minimum value formation amounts to the output value of the minimum exhaust gas temperature controller 70, the processing unit 68 sends out the signal of minimum exhaust gas temperature controller not in operation 72.

The value for the exhaust gas temperature which is determined by the processing unit 68 is transmitted to a further processing unit 74 in which ambient conditions, such as outside temperature and outside pressure, and also operationally-specific limiting values are taken into consideration. The reference value for the exhaust gas temperature which is determined in this way is transmitted to a differentiating unit 76 in which the difference to the current exhaust gas temperature actual value 78 is determined. The determined difference is transmitted to the exhaust gas temperature controller 80. In so doing, the exhaust gas temperature controller 80 is enabled if at least the input signal of exhaust gas temperature controller in operation 62 is active, or a load shedding 82 is carried out, i.e. a sudden lowering of the tapped-off load on the gas turbine 1. The output signal of the exhaust gas temperature controller 80 is then also transmitted to the processing unit 64.

In addition to the output values of the speed-load controller 54 and to that of the exhaust gas temperature controller 80, the processing unit 64 takes into consideration further input data. Associated with this are on the one hand the fuel mass flow values of the ramp function generator 84 which controls the starting process of the gas turbine 1 based on a specified fuel mass flow curve, and on the other hand the specified maximum pressure ratio reference value of the pressure ratio limiting controller 86 which monitors input and output pressures of the compressor 2 of the gas turbine 1. In the compressor 2, specifically for example in the case of explosions in the combustion chamber 4 of the gas turbine 1, a flow separation or flow reversal can occur, which would necessitate a reduction of the load of the gas turbine.

From the number of input data, the processing unit 64 selects in each case the least critical fuel mass flow value and transmits the determined smallest value to the position reference value formation unit 88 for the fuel valves. In the actual control unit 30 here for an IGCC plant, i.e. a plant with integrated coal gasification, in this case a portion of coal gas and admixed natural gas is determined in each case, and the respective value for the fuel volume is transmitted to the position controller of the natural gas valve 90 or to the position controller of the coal gas valve 92. The position controllers 90, 92 then control the position of the natural gas valve 94 or of the coal gas valve 96 in each case.

The minimum exhaust gas temperature controller 70 receives its input signal in dependence upon the operating state of the gas turbine. During the starting process of the gas turbine, it receives the load difference signal from the differentiating unit 98, which forms the difference from the reference load which is transmitted from the processing unit 46 and the current scaled load 52 of the gas turbine, and after the starting process, i.e. if both the speed-load controller 54 is enabled, the exhaust gas temperature controller is activated 56, and also the compressor minimum pressure controller is not in operation 100, it is only dependent upon the specified temperature reference value 42.

The difference from current scaled load actual value 52 and load reference value from the processing unit 46 is delivered as an input signal to the guide vane output controller 102. The guide vane output controller 102 is enabled if at least the pressure ratio limiting controller is in operation 104, or the exhaust gas temperature controller is in operation 62 and the minimum exhaust gas temperature controller is in operation 72. Furthermore, the compressor discharge pressure reference value 106 for the guide vane output controller 102 is provided as the lower limit.

Similar to the speed-load controller 54, a bridging unit 108, via which a proportional feedthrough of the reference value can be carried out when required, is also provided in the case of the guide vane output controller 102. The signal of the guide vane output controller 102 or of the bridging unit 108 is transmitted to a processing unit 110 which determines a provisional reference value for the guide vane pressure controller 112. The processing unit 110 in this case furthermore provides as input data a reference value for the compressor minimum pressure 114, unless the compressor minimum pressure controller is not activated 116. The processing unit 110 furthermore puts the compressor minimum pressure controller into operation 100.

The output signal of the processing unit 110 is transmitted to the processing unit 118. This processing unit 118 now determines a reference value for the compressor discharge pressure and in the process uses all the operationally-dependently specified limiting values for the compressor discharge pressure and also the permissible rate of change of the compressor discharge pressure. Consequently the processing unit 118 also directly receives the compressor discharge pressure actual value 120 from the sensor 32 in the gas turbine 1.

Providing neither the inlet guide vane controller is activated, i.e. the guide vanes are manually controlled, nor the exhaust gas temperature controller is in operation 62, the compressor minimum pressure controller is activated 116 or the pressure ratio limiting controller is in operation 122, the processing unit 118 sends out the instantaneous compressor discharge pressure actual value 120 as a reference value. As soon as the guide vane pressure control function is activated 124, the reference value is frozen and via the processing unit 126 is transmitted directly to the processing unit 118. This then ensures a correspondingly constant compressor discharge pressure reference value 106 which is transmitted via a differentiating unit 130 to the guide vane pressure controller 112.

The guide vane pressure controller 112 then undertakes the controlling of the guide vanes providing the inlet guide vane controller is activated 60, otherwise a manually specified guide vane reference value 132 is transmitted to the guide vane position control unit 134. This then correspondingly controls the motor 136 for the position of the guide vanes.

As a result of the new type of controlling concept, especially the consideration of the compressor discharge pressure in the processing unit 118, an altogether safer and more stable operation of the gas turbine 1 of the entire GuD plant is possible. This especially applies to such GuD plants which are designed for IGCC operation since in this case, by means of a continuous monitoring of the compressor discharge pressure and corresponding controlling of the gas turbine 1, malfunctions as a result of air extraction for the coal gasification can be consequently avoided.

The invention claimed is:

1. A method for operating a gas turbine having a compressor and combustion chamber, comprising:
   controlling the gas turbine using a compressor discharge pressure as a control variable;
   specifying a maximum rate of a change of a compressor discharge pressure;
   measuring the compressor discharge pressure using a pressure sensor disposed at an exit of the compressor; and
   limiting a rate of change of the compressor discharge pressure to the maximum rate of change, wherein the compressor comprises a plurality of variable inlet guide vanes and the compressor discharge pressure is controlled by changing positions of the inlet guide vanes when the rate of change of the compressor discharge pressure reaches the maximum rate of change,
   wherein air is extracted at an exit of the compressor,
   wherein the extracted air is fed to an air-separation plant, and
   wherein by controlling the compressor discharge pressure at the exit of the compressor, instabilities in the gas turbine due to severe pressure fluctuations from an interaction between the air coming from inside the gas turbine and that of a volume of the air extracted inside a tube leading to the air-separation plant are avoided, and the air-separation plant extracts a required mass flow.

2. The method as claimed in claim 1, wherein a reference value for the compressor discharge pressure is specified.

3. The method as claimed in claim 1, wherein an exhaust gas temperature of the gas turbine is controlled by changing a fuel fed to burners of the combustion chamber.

4. The method as claimed in claim 1, wherein oxygen produced in the air-separation plant is used for a synthesis gas.

5. The method as claimed in claim 4, wherein the synthesis gas is combusted by the gas turbine for a hot gas production.

6. A gas turbine, comprising:
   a compressor;
   a combustion chamber;
   a turbine; and
   a control unit that specifies a maximum rate of a change of a compressor discharge pressure and controls the gas turbine by using the compressor discharge pressure as a control variable,
   wherein a pressure sensor disposed at an exit of the compressor is used to measure the compressor discharge pressure,
   wherein a rate of change of the compressor discharge pressure is limited to the maximum rate of change,
   wherein the compressor comprises a plurality of variable inlet guide vanes and the compressor discharge pressure is controlled by changing positions of the inlet guide vanes when the rate of change of the compressor discharge pressure reaches the maximum rate of change, and
   wherein air is extracted at an exit of the compressor,
   wherein the extracted air is fed to an air-separation plant, and
   wherein by controlling the compressor discharge pressure at the exit of the compressor, instabilities in the gas turbine due to severe pressure fluctuations from an interaction between the air coming from inside the gas turbine and that of a volume of the air extracted inside a tube leading to the air-separation plant are avoided, and the air-separation plant extracts a required mass flow.

7. A gas and steam turbine plant, comprising:
a gas turbine comprising:
  a compressor;
  a combustion chamber;
  a turbine; and
  a control unit that specifies a maximum rate of a change of a compressor discharge pressure and controls the gas turbine by using the compressor discharge pressure as a control variable,
wherein a pressure sensor disposed at an exit of the compressor is used to measure the compressor discharge pressure, and
wherein a rate of change of the compressor discharge pressure is limited to the maximum rate of change, and
wherein the compressor comprises a plurality of variable inlet guide vanes and the compressor discharge pressure is controlled by changing positions of the inlet guide vanes when the rate of change of the compressor discharge pressure reaches the maximum rate of change,
wherein air is extracted at an exit of the compressor,
wherein the extracted air is fed to an air-separation plant, and
wherein by controlling the compressor discharge pressure at the exit of the compressor, instabilities in the gas turbine due to severe pressure fluctuations from an interaction between the air coming from inside the gas turbine and that of a volume of the air extracted inside a tube leading to the air-separation plant are avoided, and the air-separation plant extracts the required mass flow.

* * * * *